(12) United States Patent
Liu et al.

(10) Patent No.: US 8,123,551 B1
(45) Date of Patent: Feb. 28, 2012

(54) BATTERY CONNECTOR

(75) Inventors: Yun-Xiang Liu, Guang-Dong (CN);
Bing-Tao Yang, Guang-Dong (CN);
Yin-Lung Wu, Tu-Cheng (TW);
Ming-Chiang Chen, Tu-Cheng (TW)

(73) Assignee: Cheng UEI Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/894,041

(22) Filed: Sep. 29, 2010

(51) Int. Cl.
*H01R 3/00* (2006.01)
(52) U.S. Cl. .......................... 439/500; 439/862
(58) Field of Classification Search .......... 439/500–502, 439/79, 862
See application file for complete search history.

(56) References Cited

U.S. PATENT DOCUMENTS
6,361,359 B1 * 3/2002 Du et al. ................. 439/500
* cited by examiner

*Primary Examiner* — Javaid Nasri
(74) *Attorney, Agent, or Firm* — Cheng-Ju Chiang

(57) ABSTRACT

A battery connector includes an insulating housing defining rear part and a front part protruded forwardly from a middle portion of the front surface of the rear part, and a plurality of contacts. The rear part defines a plurality of contact receiving cavities. Each contact receiving cavity extends from a front surface, through a top surface and to a rear surface of the rear part. The front part defines a plurality of notches. Each notch connects to the corresponding contact receiving cavity. Each contact includes a first contacting portion, a fixing hook and a fixing plate received in the contact receiving cavity defined at the rear surface, the top surface and the front surface, and a second contacting portion partially received in the notch and partially protruded out of the notch. The top portion of the rear part is sandwiched between the first contacting portion and the fixing plate.

20 Claims, 8 Drawing Sheets

BATTERY CONNECTOR

BACKGROUND OF THE INVENTION

1. Field of the Invention

The present invention relates to an electrical connector, more specifically, to a battery connector engaging with an electrical apparatus and abutting against a printed circuit board of the electrical apparatus.

2. The Related Art

Nowadays, a portable electrical apparatus, such as mobile phone, personal digital assistant (PDA), notebook, digital camera, etc is popular due to it can be used anywhere and anytime. Because the portable electrical apparatus needs a battery for providing electric power, a battery connector is a necessary component in the portable electrical apparatus. Generally, the portable electrical apparatus has a printed circuit board and a battery connector soldered to the printed circuit board. The battery connector is connected to a battery for transmitting electric power from the battery to the printed circuit board of the electrical apparatus. Therefore, the electrical apparatus can obtain electric power from the battery.

Please refer to FIG. 1. A conventional battery connector 9 includes an insulating housing 90 and at least one contact 92. The insulating housing 90 is mounted on a printed circuit board 94 which is arranged inside an electrical apparatus (not shown in figures). The contact 92 includes a connecting portion 96 and a soldering portion 98. The connecting portion 96 protrudes from a front part of the insulating housing 90 to connect to a battery 8. The soldering portion 98 extends from a rear part of the insulating housing 90 to solder to the printed circuit board 94.

Because the battery connector 9 engages with the printed circuit board 94 via the soldering portion 98 of the contact 92 soldering to the printed circuit board 94, the battery connector 9 is weak in resisting a lateral force. Since, the battery connector 9 will be pushed to move laterally by the battery. Such that the soldering portion 98 of the contact 92 of the battery connector 9 will be damaged if the battery connector 9 is pushed to move laterally. It is unstable to transmit electric power through the battery connector 9. Especially, the above situation will be caused if the electrical apparatus is shook or struck.

An improved battery connector includes a soldering portion inserting into and soldering with the printed circuit board for improving strength of the battery connector. The improved battery connector engages with the printed circuit board by soldering the soldering portion of the contact and the printed circuit board and engagement of the contact and the insulating housing. The improved battery connector will be pushed to move relative to the printed circuit board by the battery if engagement of the contact and the insulating housing is unstable. Since, the contact of the improved battery connector will be damaged. Transmission of the electric power through the improved battery connector is unstable.

SUMMARY OF THE INVENTION

An object of the present invention is to provide a battery connector.

According to the invention, the battery connector includes an insulating housing and a plurality of contacts. The insulating housing includes a rear part and a front part. The rear part defines a plurality of contact receiving cavities. Each of the contact receiving cavities extends from a front surface and through a top surface and to a rear surface of the rear part. The front part protrudes forwardly from a middle portion of the front surface of the rear part, which defines a plurality of notches. Each of notches connects to the corresponding contact receiving cavity.

The contacts respectively are received in the contact receiving cavities. Each of the contact includes a first contacting portion being received in a part of the contact receiving cavity defined at the rear surface of the rear part, a fixing hook being received in a part of the contact receiving cavity defined at the top surface of the rear part, a fixing plate being received in a part of the contact receiving cavity defined at the front surface of the rear part, and a second contacting portion being partially received in the notch and partially protruded out of the notch. The top portion of the rear part is sandwiched between the first contacting portion and the fixing plate.

Another object of the present invention is to provide a battery connector.

According to the invention, the battery connector connects to a plate and a printed circuit board of an apparatus for connecting to a battery. The battery connector includes an insulating housing and at least one contact. The insulating housing includes a rear part and a front part. The rear part defines a font surface, a rear surface, a top surface, a bottom surface and at least one contact receiving cavity extending from the front surface and through the top surface and to the rear surface of the rear part.

The front part is protruded forwardly from a middle portion of the front surface of the rear part. The front part defines a top surface, a bottom surface and at least one notch. The notch connects to the contact receiving cavity and penetrates the top surface of the front part. A level of the top surface of the rear part is higher than a level of the top surface of the front part. A level of the bottom surface of the rear part is lower than a level of the bottom surface of the front part.

The contact is received in the contact receiving cavity. The contact includes a first contacting portion and a second contacting portion. The first contacting portion is received in a part of the contact receiving cavity defined at the rear surface of the rear part. The second contacting portion is partially received in the notch and partially protruded out of the notch.

The plate of the apparatus is abutted against the front surface of the front part and the bottom surface of the front part. The printed circuit board is abutted against the front surface of the rear part and the top surface of the front part and is pressed by the second contacting portion of the contact. The battery connects to the first connecting portion of the contact.

Another object of the present invention is to provide a battery connector.

According to the invention, the battery connector connects to a plate and a printed circuit board of an apparatus for connecting to a battery. The battery connector includes an insulating housing and at least one contact. The insulating housing defines a front surface, a rear surface, a top surface, a bottom surface, a first concave being defined between the front surface and the top surface, a second concave being defined between the front surface and the bottom surface.

The contact is fixed to the insulating housing. The contact includes a first contacting portion and a second contacting portion. The first contacting portion extends at the rear surface for connecting the battery. The second contacting portion extends into the first concave. The plate of the apparatus is engaged into the second concave of the insulating housing. The printed circuit board is engaged into the first concave of the insulating housing and is pressed by the second contacting portion of the contact.

Because the second contacting portion of the contact is pressed on the printed circuit board, it can slide on and connect to the printed circuit board if the battery connector and the printed circuit board are horizontally moved from each other. Also, due to the elasticity of the second connecting portion of the contact, the second connecting portion of the contact can press on and contact to the printed circuit board if the battery connector and the printed circuit board are vertically moved from each other.

Because the contact is hooked at a top portion of the rear part of the insulating housing, the contact can be firmly engaged with the insulating housing to resist a horizontal force. Therefore, contact of the battery connector will be prevented from damage if the electrical apparatus is shook or struck.

The stability and strength of the battery connector are improved.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENT

Figure 1:
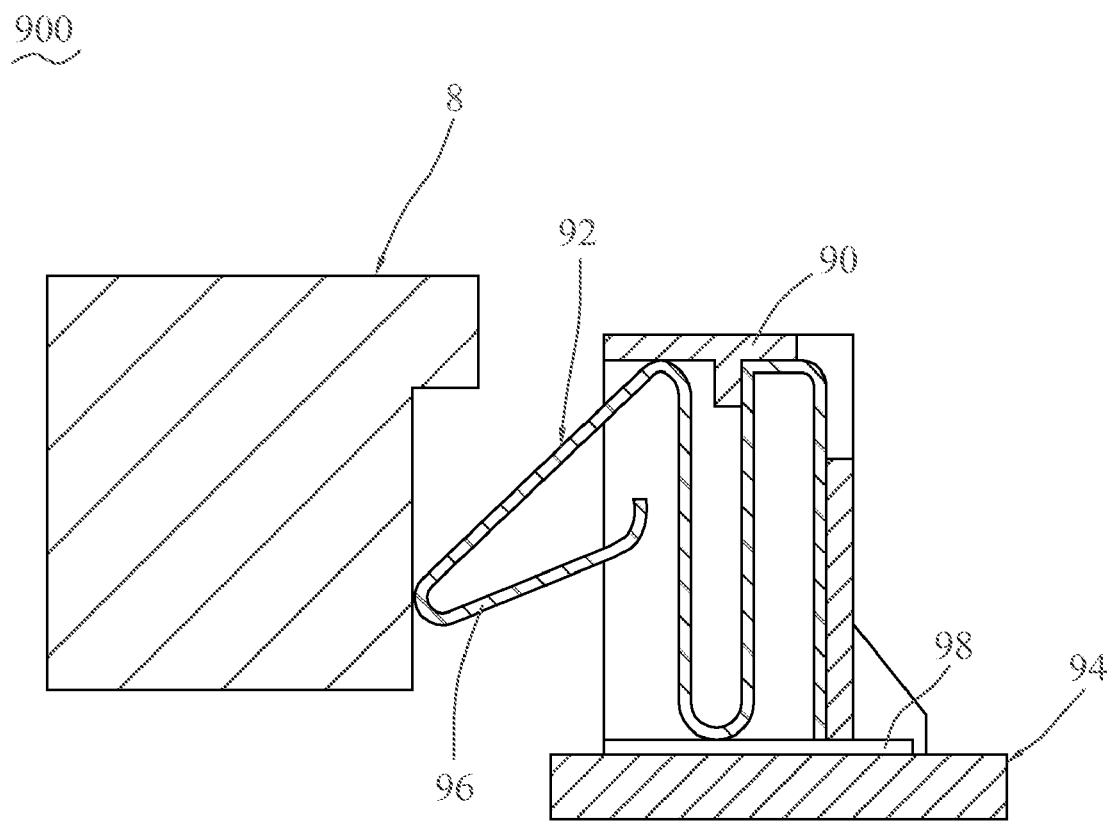
FIG. 1 is a cross section view showing a conventional battery connector mounted on a printed circuit board and connected to a battery.
Figure 2:
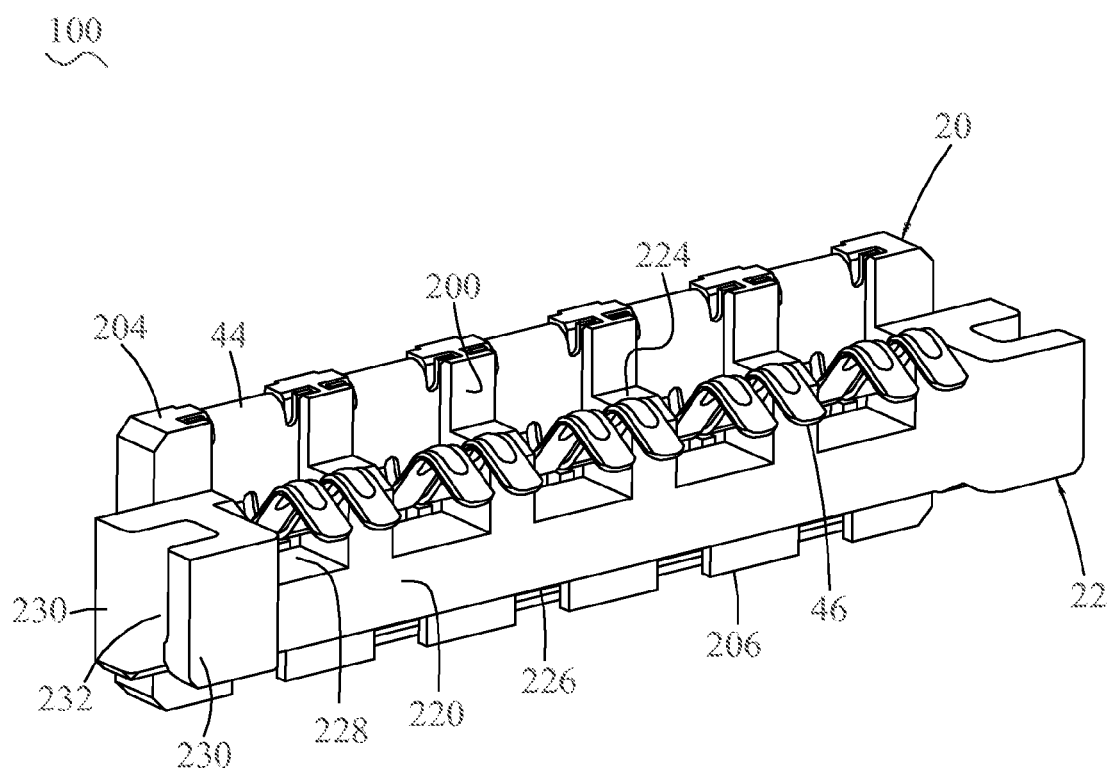
FIG. 2 is a perspective view of a preferred embodiment of a battery connector seen from the front side according to the present invention.
Figure 3:
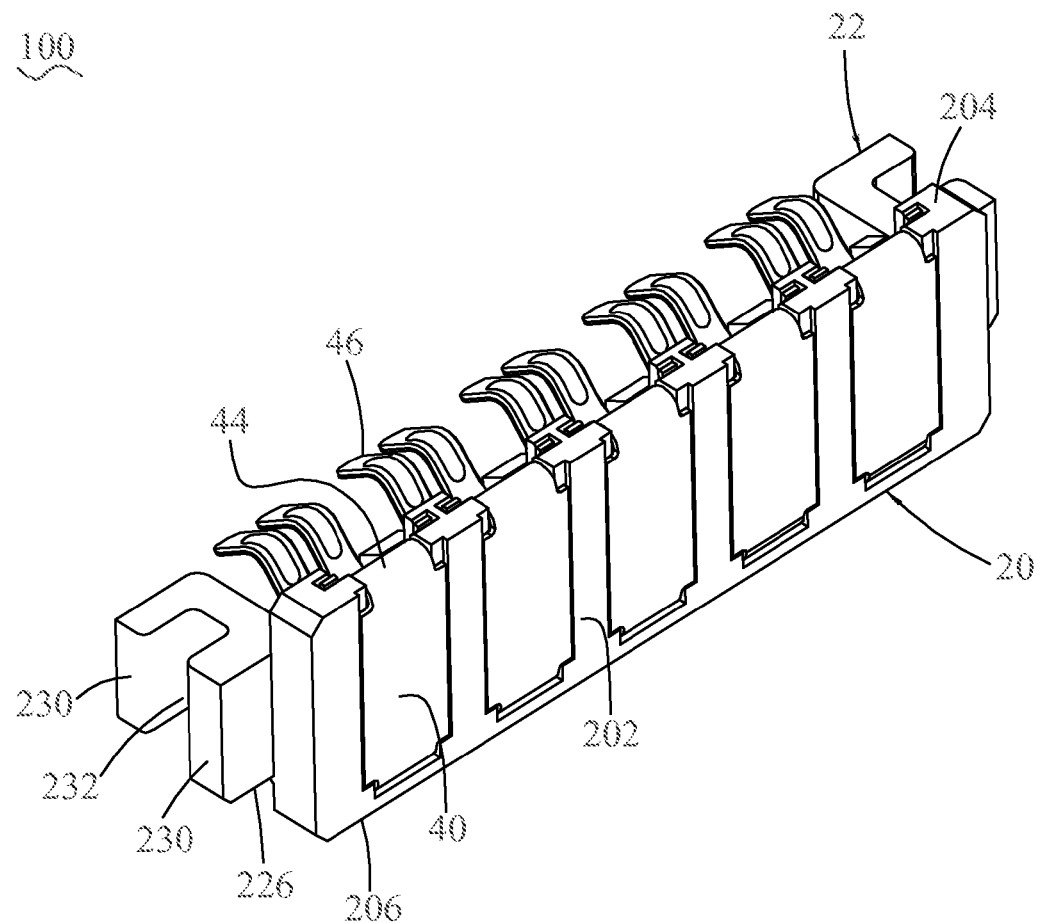
FIG. 3 is a perspective view of the battery connector seen from the rear side according to the present invention.
Figure 4:
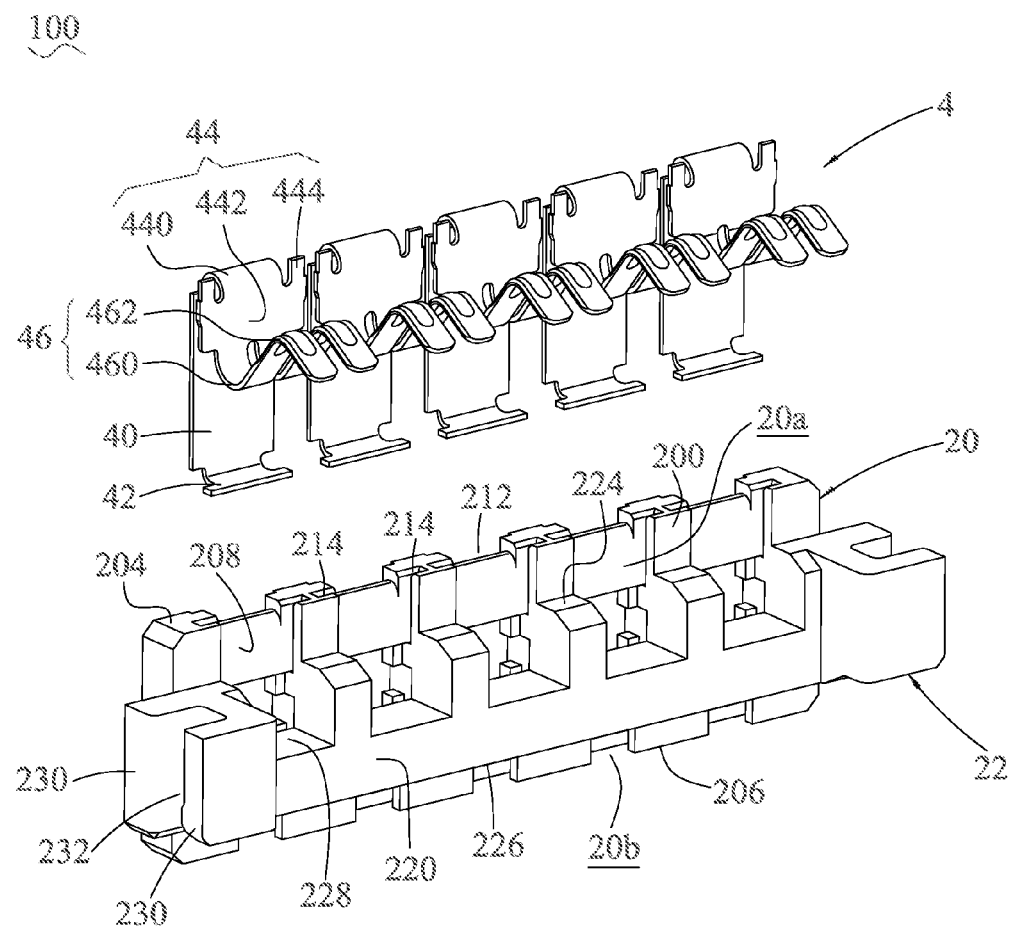
FIG. 4 is an exploded view of the battery connector seen from the front side according to the present invention.
Figure 5:
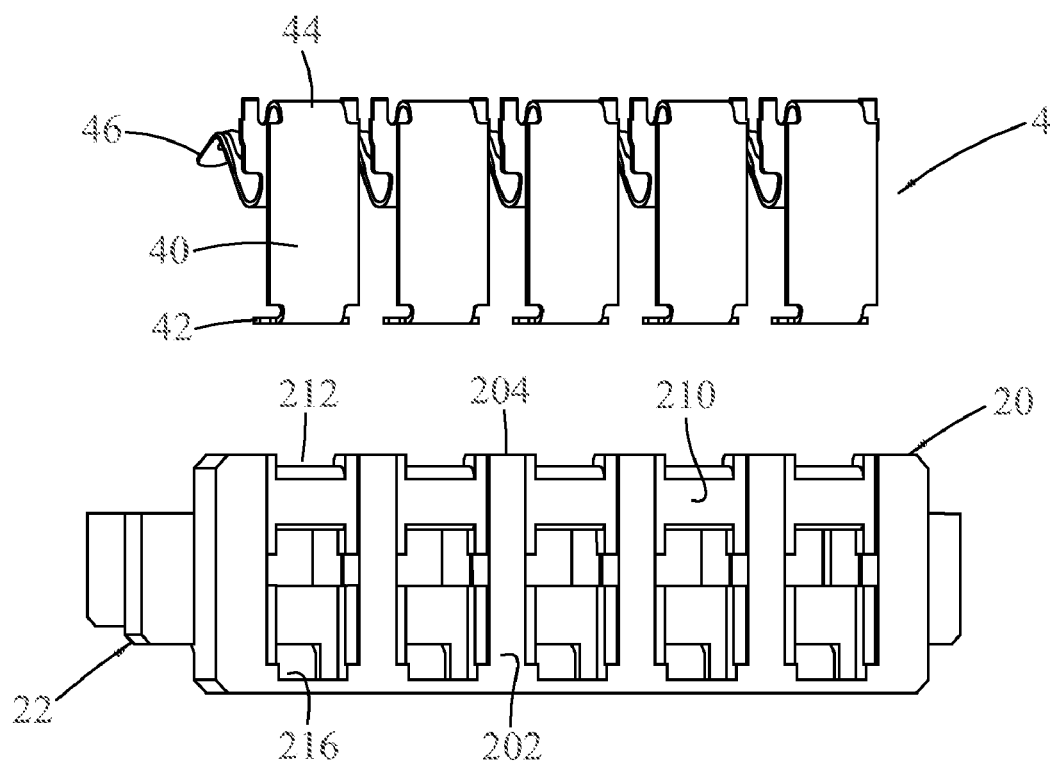
FIG. 5 is an exploded view of the battery connector seen from the rear side according to the present invention.
Figure 6:
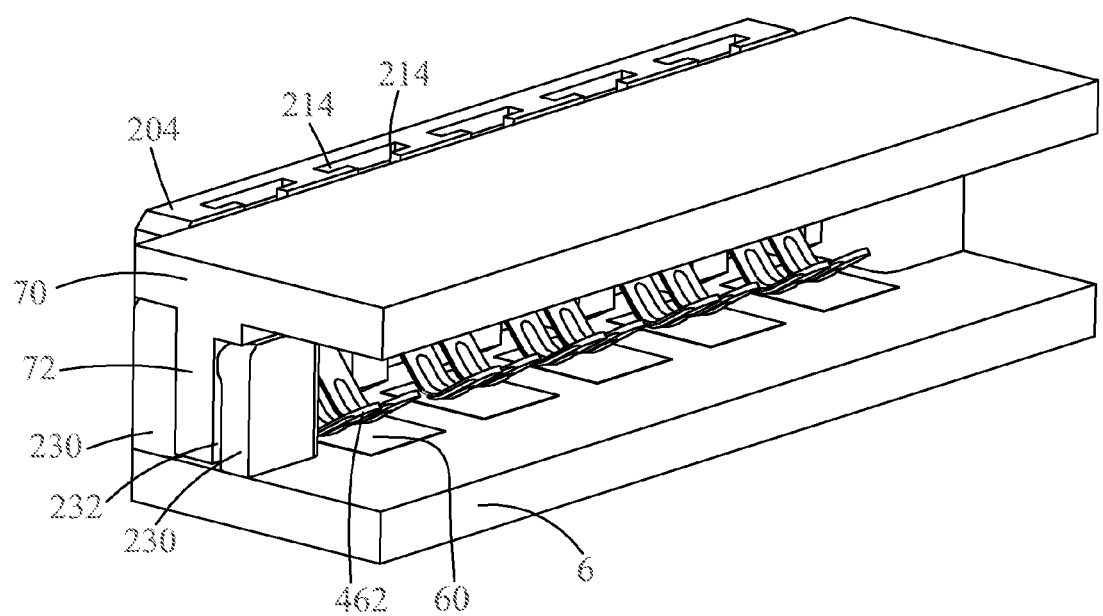
FIG. 6 is a perspective view showing the battery connector connected to a printed circuit board and a plate of an electrical apparatus.
Figure 7:
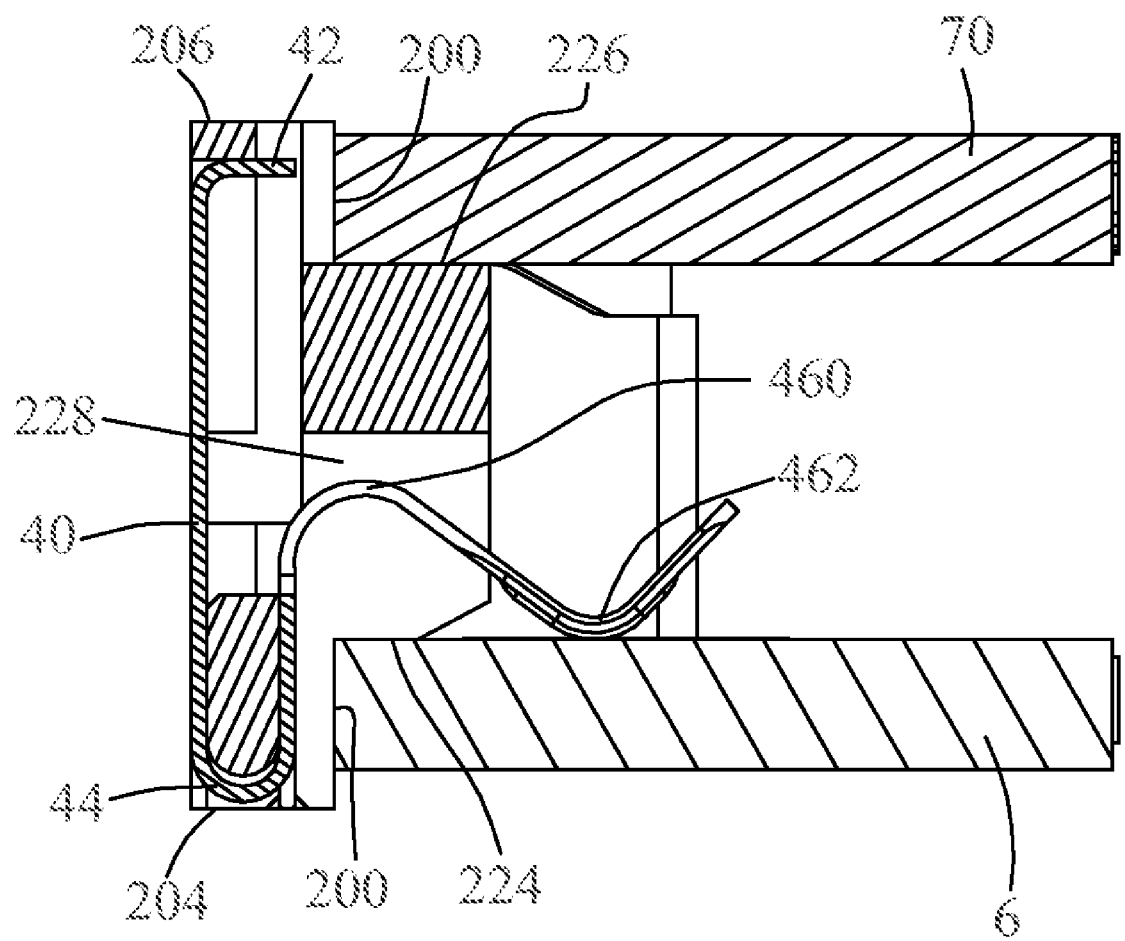
FIG. 7 is a cross section view showing the battery connector connected to the printed circuit board and the plate of the electrical apparatus.
Figure 8:
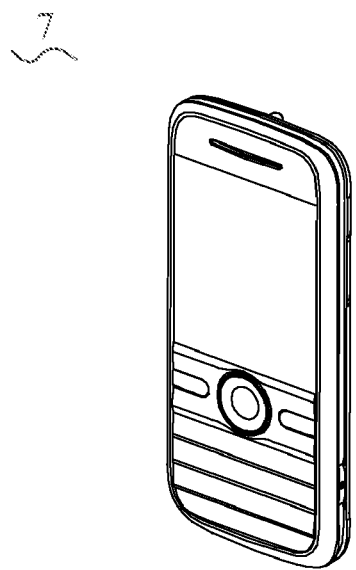
FIG. 8 is a perspective view of the electrical apparatus.
Figure 9:
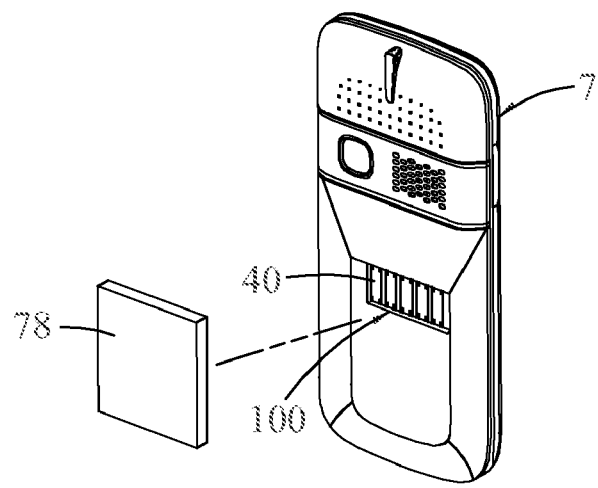
FIG. 9 shows the battery connector positioned in the electrical apparatus and connected to a battery.

Please refer to FIG. 2 to FIG. 9. A preferred embodiment of a battery connector 100 includes an insulating housing 2 and a plurality of contacts 4. The battery connector 100 is arranged in an electrical apparatus 7 and interconnected a battery 78 and a printed circuit board 6 inside the electrical apparatus 7.

The insulating housing 2 includes a rear part 20 and a front part 22. The rear part 20 is formed as a rectangular plate to define a first front surface 200, a rear surface 202 opposite to the first front surface 200, a first top surface 204 and a first bottom surface 206 opposite to the first top surface 204.

The first front surface 200 of the rear part 20 defines a plurality of front cavities 208. The rear surface 202 of the rear part 20 defines a plurality of rear cavities 210. The first top surface 204 of the rear part 20 defines a plurality of top cavities 212. Each of the top cavities 212 interconnects each of the front cavities 208 and each of the rear cavities 210.

The first top surface 204 also defines a plurality of slits 214 which are positioned beside each top cavity 212 and extended downwardly. The rear surface 202 of the rear part 20 also defines a plurality of receiving spaces 216. Each of the receiving spaces 216 is connected to a bottom portion of each rear cavity 210.

The front part 22 protrudes from a middle portion of the first front surface 200 of the rear part 20. The front part 22 is formed as a rectangular shape to define a second front surface 220, a pair of side surfaces 222, a second top surface 224 and a second bottom surface 226 opposite to the second top surface 224. Especially, a level of the second top surface 224 is lower than a level of the first top surface 204. A level of the second bottom surface 226 is higher than a level of the first bottom surface 206 of the rear part 20.

The second front surface 220 defines a plurality of notches 228 which penetrate the second top surface 224. Each of the notches 228 is connected to each of the front cavities 26 of the rear part 20. Each side surface 222 is laterally protruded to form a pair of extension plates 230. Especially, the extension plates 230 are extended vertically. The extension plates 230 and the side surface 222 together define a channel 232 therebetween.

Specially, a corner where the first top surface connected to the second front surface is cut to form a first concave 20a, and a corner where the first bottom surface connected to the second surface is cut to form a second concave 20b. In this embodiment, the first concave 20a is defined by the first front surface 200 of the rear part 20 and the second top surface 224 of the front part 22. The second concave 20b is defined by the first front surface 200 of the rear part 20 and the second bottom surface 226 of the front part 22.

The contacts 4 are engaged with the insulating housing 2. Each of the contacts 4 includes a first connecting portion 40, a fixing portion 42, a second fixing portion 44 and a second connecting portion 46. The first connecting portion 40 is formed as a plate. The first fixing portion 42 is curved forwardly from a bottom end of the first connecting portion 40.

The second fixing portion 44 includes a fixing hook 440 and a fixing plate 442. The fixing hook 440 is extended upwardly from a top end of the first connecting portion 40 and then curved forwardly and downwardly to form an inverted U-shape. The fixing plate 442 is extended downwardly from a free end of the fixing hook 440.

The second connecting portion 46 is formed as a S-shaped which includes a U turn 460 and an inverted U turn 462. The U turn 460 is extended downwardly from a bottom end of the fixing plate 442 of the second fixing portion 44 and then curved forwardly and upwardly. The inverted U turn 462 is extended upwardly from a free end of the U turn 460 and then curved forwardly and downwardly. Especially, lateral edges of the fixing plate 442 of the second fixing portion 44 are respectively extended to form a fixing strip 444.

If the insulating housing 2 and the contacts 4 are assembled, the first connecting portion 40 of each contact 4 is received in the rear cavity 210. The first fixing portion 42 of the contact 4 is fixed in the receiving space 216. The second fixing portion 44 is hooked at a top portion of the rear part 20 of the insulating housing 2.

Especially, the fixing hook 440 of the second fixing portion 44 is substantially received in a top portion of the rear cavity 210, a top portion of the front cavity 208 and the top cavity 212. The fixing plate 442 is received in the front cavity 208. Therefore, the top portion of the rear part 20 of the insulating housing 2 is fixed between the first contacting portion 40 and the fixing plate 442 of the second fixing portion 44 of the contact 4.

The second contacting portion 46 of the contact 4 is partially received in the notch 228 of the front part 22 of the insulating housing 2 and partially protruded from the second front surface 220 and the second top surface 224 of the front part 22 of the insulating housing 2. Especially, the U turn 460 of the second contacting portion 46 is received in the notch 228. The inverted U turn 462 of the second contacting portion 46 is protruded from the second front surface 220 and the second top surface of 224 the front part 22 of the insulating housing 2.

The fixing strip 444 of the contact 4 is fixed in the slit 214 of the rear part 20 of the insulating housing 2. The front cavity 208, the rear cavity 210, the top cavity 212, the receiving space 216 and the notch 226 are formed as a contact receiving portion for receiving the contact 4.

Because the contact 4 is hooked at the top portion of the rear part 20 of the insulating housing 2, the top portion of the rear part 20 of the insulating 2 is fixed between the first connecting portion 40 and the second fixing portion 44, the first fixing portion 42 is fixed in the receiving space and the fixing strip 444 is fixed in the slit 214, the contact 4 can be firmly engaged with the insulating housing 2.

If the battery connector 100 is fixed to the electrical apparatus, a plate 70 of the electrical apparatus 7 is abutted against the first front surface 200 of the rear part 20 and the second bottom surface 226 of the front part 22 of the insulating housing 2. Specially, the plate 70 of the electrical apparatus 7 is engaged into the second concave 20b of the insulating housing 2. A pair of pillars extending from the plate 70 of the electrical apparatus is engaged into the channel 232 of the front part 22 of the insulating housing 2. Since, the battery connector 100 can be engaged with the electrical apparatus.

If the battery connector 100 is connected to the printed circuit board 6, the printed circuit board 6 is abutted against the first front surface 200 of the rear part 20 and the second top surface 224 of the front part 22 of the insulating housing 2. Specially, the printed circuit board 6 is engaged into the first concave 20a of the insulating housing 2.

The inverted U turn 462 of the second connecting portion 46 of the contact 4 of the battery connector 100 is pressed on a corresponding conductive pad 60 of the printed circuit board 6. The battery can connect to the first connecting portion 40 of the contact 4 of the battery connector 100. Since, the battery can provide electric power to the printed circuit board 6 through the battery connector 100.

As described above, because the second contacting portion 46 of the contact 4 is pressed on the printed circuit board 6, it can slide on and connect to the printed circuit board if the battery connector 100 and the printed circuit board 6 are horizontally moved from each other. Also, due to the elasticity of the second connecting portion 46 of the contact 4, the second connecting portion 46 of the contact 4 can press on and contact to the printed circuit board if the battery connector 100 and the printed circuit board 6 are vertically moved from each other.

Because the contact 4 is hooked at the top portion of the rear part 20 of the insulating housing 2, the top portion of the rear part 20 of the insulating 2 is fixed between the first connecting portion 40 and the second fixing portion 44, the first fixing portion 42 is fixed in the receiving space and the fixing strip 444 is fixed in the slit 214, the contact 4 can be firmly engaged with the insulating housing 2 to resist a horizontal force. Therefore, contact 4 of the battery connector 100 will be prevented from damage if the electrical apparatus is shook or struck. The stability and strength of the battery connector 100 are improved.

Furthermore, the present invention is not limited to the embodiments described above; diverse additions, alterations and the like may be made within the scope of the present invention by a person skilled in the art. For example, respective embodiments may be appropriately combined.

What is claimed is:

1. A battery connector, comprising:
   an insulating housing comprising:
   a rear part defining a plurality of contact receiving cavities, each of the contact receiving cavities extending from a front surface and through a top surface and to a rear surface of the rear part; and
   a front part protruding forwardly from a middle portion of the front surface of the rear part, and defining a plurality of notches, each of the notches connecting to the corresponding contact receiving cavity; and
   a plurality of contacts respectively being received in the contact receiving cavities, each of the contacts comprising:
   a first contacting portion being received in a part of the contact receiving cavity defined at the rear surface of the rear part;
   a fixing hook being received in a part of the contact receiving cavity defined at the top surface of the rear part;
   a fixing plate being received in a part of the contact receiving cavity defined at the front surface of the rear part; and
   a second contacting portion being partially received in the notch and partially protruded out of the notch;
   wherein the top portion of the rear part are sandwiched between the first contacting portion and the fixing plate.

2. The battery connector as claimed in claim 1, further comprising a pair of extension plates laterally protruded from each of side surfaces of the insulating housing, the extension plates and the side surface together defining a channel therebetween.

3. The battery connector as claimed in claim 2, wherein the notch is penetrated a front surface and a top surface of the front part.

4. The battery connector as claimed in claim 3, wherein a level of the top surface of the rear part is higher than a level of the top surface of the front part, a level of a bottom surface of the rear part is lower than a level of a bottom surface of the front part.

5. The battery connector as claimed in claim 4, wherein the second contacting portion of the contact comprises:
   a U turn extending from the fixing plate; and
   an inverted U turn extending from the U turn, the U turn is received in the notch, the inverted U turn is protruded out of the notch.

6. The battery connector as claimed in claim 5, further comprising:
   a receiving space defined at the rear surface of the rear part and connected to a bottom portion of the part of the contact receiving cavity defined at the rear surface of the rear part; and
   a fixing portion extending from a bottom end of the first contacting portion of the contact and being received in the receiving space.

7. The battery connector as claimed in claim 6, further comprising:
   at least one slit defined beside the part of the contact receiving cavity defined at the front surface of the rear part and penetrated the top surface of the rear part; and
   a fixing strip laterally extending from a side edge of the fixing plate of the contact and fixed in the slit.

8. A battery connector connected to a plate and a printed circuit board of an apparatus for connecting to a battery, comprising:
   an insulating housing comprising:

a rear part defining a front surface, a rear surface, a top surface, a bottom surface and at least one contact receiving cavity extending from the front surface and through the top surface and to the rear surface of the rear part; and a front part protruding forwardly from a middle portion of the front surface of the rear part, and defining a top surface, a bottom surface and at least one notch, the notch connecting to the contact receiving cavity and penetrating the top surface of the front part, a level of the top surface of the rear part is higher than a level of the top surface of the front part, a level of the bottom surface of the rear part is lower than a level of the bottom surface of the front part; and at least one contact being received in the contact receiving cavities and comprising:

a first contacting portion being received in a part of the contact receiving cavity defined at the rear surface of the rear part; and a second contacting portion being partially received in the notch and partially protruded out of the notch;

wherein the plate of the apparatus is abutted against the front surface of the front part and the bottom surface of the front part, the printed circuit board is abutted against the front surface of the rear part and the top surface of the front part and being pressed by the second contacting portion of the contact, the battery is connected to the first connecting portion of the contact.

9. The battery connector as claimed in claim 8, further comprising:

at least one pillar extending from the plate of the apparatus; and a pair of extension plates laterally protruded from a side surface of the insulating housing, the extension plates and the side surface together defining a channel therebetween for being inserted into the pillar.

10. The battery connector as claimed in claim 9, wherein the notch is penetrated a front surface of the front part.

11. The battery connector as claimed in claim 9, wherein the contact comprises:

a fixing hook being received in a part of the contact receiving cavity defined at the top surface of the rear part; and a fixing plate being received in a part of the contact receiving cavity defined at the front surface of the rear part.

12. The battery connector as claimed in claim 11, wherein the second contacting portion of the contact comprises:

a U turn extending from the fixing plate; and an inverted U turn extending from the U turn, the U turn is received in the notch, the inverted U turn is protruded out of the notch.

13. The battery connector as claimed in claim 12, further comprising:

a receiving space defined at the rear surface of the rear part and connected to a bottom portion of the part of the contact receiving cavity defined at the rear surface of the rear part; and a fixing portion extending from a bottom end of the first contacting portion of the contact and being received in the receiving space.

14. The battery connector as claimed in claim 13, further comprising:

at least one slit defined beside the part of the contact receiving cavity defined at the front surface of the rear part and penetrated the top surface of the rear part; and a fixing strip laterally extending from a side edge of the fixing plate of the contact and fixed in the slit.

15. A battery connector connected to a plate and a printed circuit board of an apparatus for connecting to a battery, comprising:

an insulating housing defining a front surface, a rear surface, a top surface, a bottom surface, a first concave being defined between the front surface and the top surface, a second concave being defined between the front surface and the bottom surface;

at least one contact fixed to the insulating housing, comprising a first contacting portion extending at the rear surface for connecting the battery; and a second contacting portion extending into the first concave; and wherein the plate of the apparatus is engaged into the second concave of the insulating housing, the printed circuit board is engaged into the first concave of the insulating housing and being pressed by the second contacting portion of the contact.

16. The battery connector as claimed in claim 15, further comprising:

at least one pillar extending from the plate of the apparatus;

a pair of extension plates laterally extending from a side surface of the insulating housing, the extension plates and the side surface together defining a channel therebetween for receiving the pillar.

17. The battery connector as claimed in claim 16, wherein the contact comprises:

a fixing hook interconnecting the first connecting portion and the second connecting portion for hooking the insulating housing.

18. The battery connector as claimed in claim 17, wherein the insulating housing defining a contact receiving cavity, for receiving the contact, extending from the rear surface to a front part of the insulating housing to penetrate the first concave, the second contact portion of the contact extends into the first concave from the contact receiving cavity defined at the front part.

19. The battery connector as claimed in claim 18, wherein the second contacting portion of the contact comprises:

a U turn extending from the fixing hook; and an inverted U turn extending from the U turn, the U turn is received in the contact receiving cavity, the inverted U turn extends into the first concave from the contact receiving cavity.

20. The battery connector as claimed in claim 19, further comprising:

a receiving space defined at the rear surface of the insulating housing and connected to a bottom portion of a part of the contact receiving cavity defined at the rear surface of the insulating housing;

a fixing portion extending from a bottom end of the first contacting portion of the contact and being received in the receiving space;

at least one slit defined beside the contact receiving cavity; and a fixing strip laterally extending from a side edge of the fixing hook of the contact and fixed in the slit.

* * * * *